United States Patent [19]

Benson

[11] Patent Number: 5,099,124

[45] Date of Patent: Mar. 24, 1992

[54] LEVEL DETECTING APPARATUS

[76] Inventor: Royal H. Benson, 1522 19th Ave. N., Texas City, Tex. 77590

[21] Appl. No.: 557,625

[22] Filed: Jul. 24, 1990

[51] Int. Cl.⁵ .................. G01F 23/00; G01N 23/09; G01T 3/00
[52] U.S. Cl. ............... 250/357.1; 250/390.06
[58] Field of Search ............... 250/357.1, 390.06, 391

[56] References Cited

U.S. PATENT DOCUMENTS

| | | | |
|---|---|---|---|
| 3,255,346 | 6/1966 | Brunton et al. | 250/357.1 X |
| 3,787,682 | 1/1974 | Bagge et al. | 250/357.1 |
| 4,038,548 | 7/1977 | Charlton | 250/357.1 |
| 4,369,368 | 1/1983 | Bernard et al. | 250/357.1 |
| 4,794,256 | 12/1988 | DiMartino et al. | 250/357.1 |

FOREIGN PATENT DOCUMENTS 249503  2/1961  Australia ............ 250/357.1

OTHER PUBLICATIONS

"TN's NeuLevel ™ Neutron Backscatter System", three page brochure, Bulletin Level, undated.
"TN's NEU-SCAN ™ Portable Level", two page brochure, Bulletin Level, undated.

Primary Examiner—Constantine Hannaher
Assistant Examiner—Edward J. Glick
Attorney, Agent, or Firm—Browning, Bushman, Anderson & Brookhart

[57] ABSTRACT

An apparatus for detecting the interface between a hydrogen-containing substance and a second substance of different hydrogen content in a vessel comprising a first elongate source body containing a source of fast neutrons and having an L/D of at least about 4 and providing a substantially uniform flux density of fast neutrons radiating outwardly along the length of the elongate body, a second elongate detector body, the detector body including a slow neutron detecting substance providing substantially uniform detection of slow neutrons along the length of the detector body to provide an output proportional to the number of slow neutrons detected, the source body and the detector body being disposed in substantially parallel relationship to one another, in sufficient proximity to one another and to the vessel and in overlapping relationship to the interface whereby the output from the detector body varies substantially linearly with the change in position of the interface in the vessel.

9 Claims, 2 Drawing Sheets

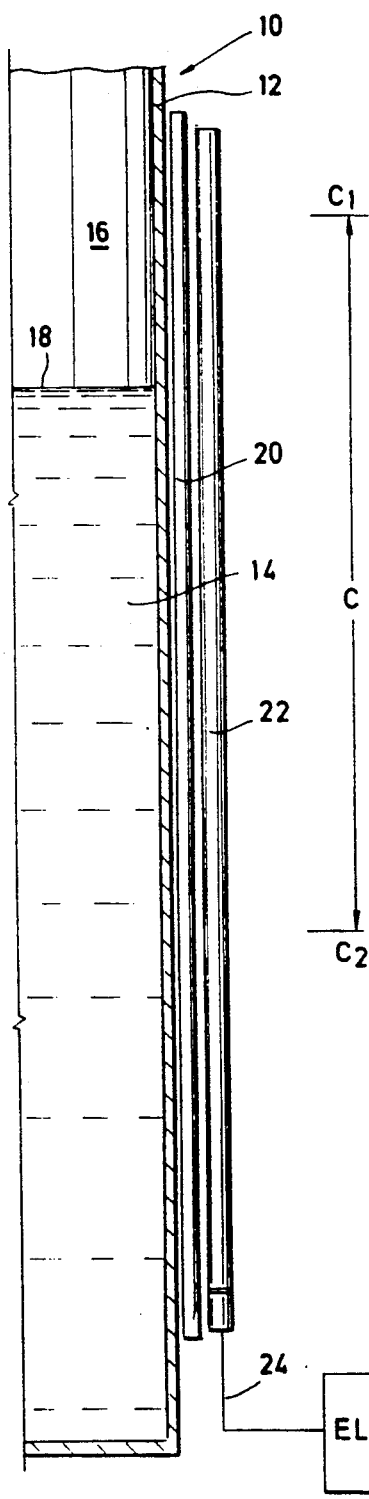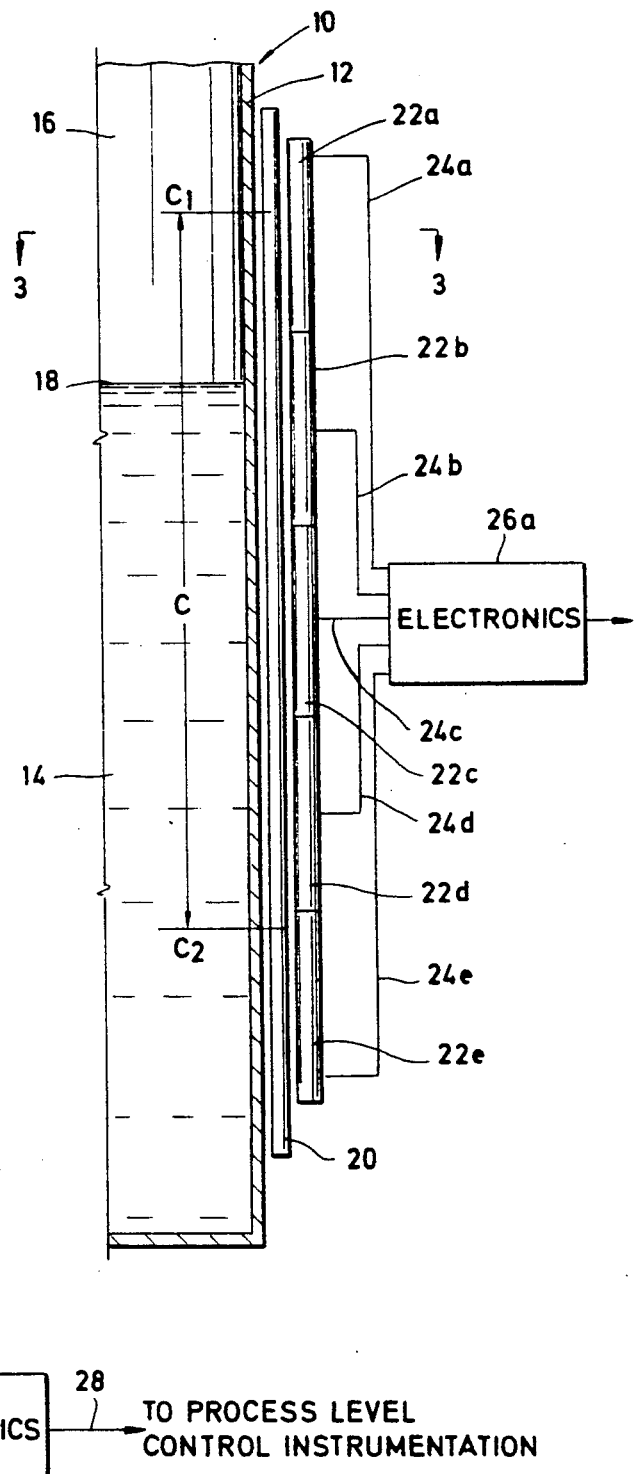

LEVEL DETECTING APPARATUS

BACKGROUND OF THE INVENTION

1. Field of the Invention

The present invention relates to an apparatus for detecting the interface between a hydrogen-containing substance and a second substance of different hydrogen content in a vessel or container. More particularly, the present invention relates to an apparatus for detecting the level of the interface of the hydrogen-containing substance in a vessel.

2. Description of the Background

A number of systems have been proposed which use radioactive sources for non-intrusive level detection, and control of liquid or solid levels in vessels. These devices generally use potent radioactive sources of gamma rays and suitable detectors to measure the attenuation of the gamma rays caused by level changes within the vessels. These devices suffer from many drawbacks, such as dangerously high levels of gamma radiation, expensive and heavy shielding requirements for safety, and non-linear response signals leading to poor accuracy and precision. These systems have been in commercial use for many years in spite of their many disadvantages.

A different type of level detector system uses an isotopic point source of fast neutrons in combination with a slow neutron detector tube. In this system, the portable source-detector assembly is usually mounted on a rod so that it can be easily moved up and down the walls of a vessel. For this technique to work, the material in the vessel must be or include a hydrogen-containing substance. Thus, the level of substance, such as water, hydrocarbons, aqueous solutions, organic molecules containing hydrogen and solids, such as grain or plastic powders, can be detected or determined. When the source-detector assembly is positioned on the vessel wall at a level below the level of the hydrogen-containing substance in the vessel, an abrupt increase in output signal is produced by the slow neutron detector tube. This is caused by fast neutrons from the source entering the vessel and interacting with the hydrogen atoms therein. The fast neutrons are slowed by these interactions (moderated) and deflected in different directions. Some are deflected through an angle of 180° and are emitted from the vessel as slow neutrons which can now be detected by the slow neutron detector tube. The process by which these fast neutrons are slowed and reflected is generally referred to as "backscattering." If the source-detector assembly is now slowly raised, an abrupt drop in detector output signal occurs when the surface level (interface) is reached, since the number of backscattered neutrons drops sharply. The operator typically measures or marks the level of the liquid in the vessel by "searching" up and down to more accurately locate the level on the vessel where the signal change occurred. Accuracy of plus or minus one-half inch is generally obtained by this technique. The best accuracy is obtained from a very small "point" source of fast neutrons, and a horizontally oriented slow neutron detector tube. Both of these features tend to sharpen the "break" which indicates the liquid level in the vessel.

Another type of neutron backscattering system takes the form of a source-detector assembly mounted permanently on a vessel wall. If the liquid in the vessel rises above the source-detector assembly, an abrupt increase in signal due to backscattered neutrons is produced which can be used by conventional process control techniques to close valves to cause the level to drop and open again when the level falls below the control point. Such applications are referred to as "on-off" level controllers. This system also uses a point (small and very compact) source of fast neutrons mounted adjacent to a horizontally oriented slow neutron detector tube. This geometry is standard and was chosen to produce the most abrupt signal change possible in response to the changing interface level with respect to the detector to achieve improved accuracy of level detection and control. Ideally, the device would have a zero control span since it attempts to control at a single point. In practice, the control span is about plus or minus 0.5 inches.

Neutron backscattering detection has also been used in a portable source-detector assembly for locating air pockets in sunken ships or submarines. In this application, a diver "searches" over the hull of a sunken vessel with a source-detector assembly. The high backscatter signal from the surrounding water drops when the source detector reaches an air pocket inside the hull, indicating a good area to search for survivors.

In all of the above-described systems, the neutron detector tube is attached to an electronic console, which supplies high voltage and measures the number of voltage pulses caused by slow neutrons detected by the detector tube. This signal is usually referred to as the count rate. This count rate signal is readily displayed on an analog meter. It can be averaged, damped, amplified and used for process control as desired.

In all of the systems described above, a small, essentially point source of fast neutrons is employed. Moreover, the prior art systems basically only tell when a given interface is reached as opposed to having the ability to monitor, on a continuous basis, the location or change in level of the interface.

SUMMARY OF THE INVENTION

It is therefore an object of the present invention to provide an improved apparatus for detecting the interface between a hydrogen-containing substance in a vessel and another substance of different hydrogen content.

A further object of the present invention is to provide an apparatus employing neutron backscattering techniques for determining the interface of a hydrogen-containing substance with another substance over long control spans.

Still a further object of the present invention is to provide an apparatus for continuously measuring, over a control span, the position or level of an interface between the hydrogen-containing substance of different hydrogen content and a second substance in a vessel.

Yet a further object of the present invention is to provide an apparatus for determining the level of the interface between a hydrogen-containing substance and at least one additional substance of different hydrogen content in a vessel wherein the output signal produced by a slow neutron detector varies substantially linearly with the position of said interface.

The above and other objects will become apparent from the following description, the drawings and the appended claims.

The apparatus of the present invention for detecting the interface between a hydrogen-containing substance and a second substance, which is understood to have a different hydrogen content, in the vessel includes a first elongate source body which contains a source of fast neutrons. The first elongate body has a length to diameter ratio (L/D) of at least about 4 and a substantially uniform flux density of fast neutrons radiating outwardly along the length of the source body. The apparatus further includes a second elongate, detector body. The detector body includes means which provide substantially uniform detection of slow neutrons along its length to thereby provide an output proportional to the number of slow neutrons detected. The source body and the detector body are disposed in substantially parallel relationship to one another, in sufficient proximity to one another and to the vessel and in overlapping relationship to the interface in the vessel such that the output from the detector body varies substantially linearly with the change in position of the interface in the vessel.

BRIEF DESCRIPTION OF THE DRAWINGS

FIG. 1 is an elevational view, partly in section, showing a prior art apparatus and associated electronics disposed so as to detect the position of a liquid-gas interface in a vessel.

FIG. 2 is an elevational view, partly in section, showing the apparatus of the present invention wherein the detector tube is comprised of a series of stacked detector modules.

DESCRIPTION OF THE PREFERRED EMBODIMENT

Figure 3:
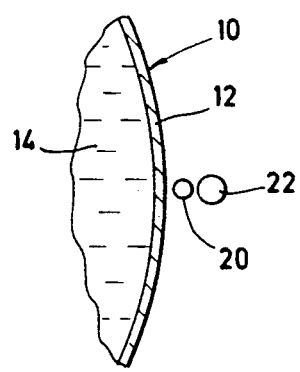
FIG. 3 is a top view showing a relative positional relationship of the detector tube, the source tube and a vessel.

Referring now to FIG. 1, a vessel, shown generally as 10, has a cylindrical wall 12 containing a liquid 14, the liquid 14 comprising a hydrogen-containing substance, such as water, hydrocarbon, etc. A vapor or air phase 16 exists in the vessel 10 above the liquid 14, an interface 18 being defined at the juncture of the liquid 14 and the vapor phase 16, the interface 18 therefore defining the level of the liquid 14 in the vessel 10. Mounted or positioned in a suitable manner (not shown) externally of vessel 10 but adjacent to wall 12 is a source tube 20, source tube 20 containing a source of fast neutrons which provides a substantially uniform flux density of fast neutrons radiating outwardly along the length of tube 20. Disposed parallel to tube 20 is a detector tube 22, tube 22 including means which provide a substantially uniform detection of slow neutrons along the length of tube 22 such that an output from tube 22 is proportional to the number of slow neutrons detected. As shown, source tube 20 is slightly longer than detector tube 22 which is desirable to ensure uniform, linear response over the entire length of detector tube 22. In point of fact, the source tube 20 will generally have a length relative to the length of the detector tube 22 which gives a uniform, linear response over a desired control range which overlaps the interface. Thus, the detector tube can be shorter than, longer than or approximately the same length as the source tube, in the preferred case, the detector tube being approximately the same length as the source tube and in the most preferred case longer than the source tube. As can be seen, both source tube 20 and detector tube 22 are disposed in an overlapping relationship to the interface 18, i.e. they both extend above and below the interface 18. Source tube 20 and detector tube 22 are disposed in parallel relationship to one another, and in sufficient proximity to one another and to the vessel 10 whereby the output from detector body 22 will vary substantially linearly with the change in position of the interface 18 in the vessel 10. Detector tube 22 is connected by a suitable high voltage lead 24 to an electronic console 26 which serves to supply high voltage to the detector tube 22 and processes the signals from detector tube 22 by circuitry well known to those skilled in the art to provide a voltage or current which is proportional to the count rate produced by detector tube 22 in response to slow neutrons detected by detector tube 22. The output from electronic console 26, which is representative of the slow neutrons detected by detector tube 22, is fed by a suitable lead 28 to process level control instrumentation well known to those skilled in the art for controlling the level of the liquid 14 in the vessel 10.

In operation, as the level of the hydrogen-containing liquid 14 rises above the bottom of tube 20, the number of fast neutrons emitted from source tube 20 and entering liquid 14 increases sharply. As is well known, these fast neutrons are slowed or moderated and reflected back or backscattered out of liquid 14 and impinge on detector tube 22 as slow neutrons with the result that the detector tube shows an increased output signal. As the level of the liquid 14 increases further, the number of backscattered neutrons detected by detector tube 22 increases proportionately. As will be seen hereafter, the increase in the number of backscattered neutrons and hence the output from detector tube 22 is almost perfectly linear with the increase in liquid level over the greater length of the source tube 20 and the detector tube 22. This results from the linear increase in the number of backscattered neutrons with a corresponding linear increase in liquid level.

It is generally desired to know the position of the interface or liquid level over some range which can be considered a control range within the vessel 10. For example, with reference to FIG. 1, if it is assumed that it is desired to know the position of the interface 18 over the control range C which extends from a point $c_1$ to $c_2$, the length of the source tube 20 and detector tube 22 would be ideally chosen such that they would have lengths which extend beyond points $c_1$ and $c_2$ for a distance such that when the interface 18 was at any point between points $c_1$ and $c_2$, there would be an output from the detector tube 22 which varied linearly with the position of the interface 18 between points $c_1$ and $c_2$. This would accommodate any nonlinearity which can occur near either end of the source and detector tube array resulting from internal connections to the detector tube, non-uniform flux density from the source at the ends or other such factors.

Referring now to FIG. 2, there is shown an embodiment of the apparatus of the present invention designed to achieve higher accuracy. As in the case of the apparatus shown in FIG. 1, a source tube 20 is positioned adjacent the wall 12 of tank 10. However, instead of a single detector tube, such as detector tube 22, there is a stacked array of individual detector tubes 22a, 22b, 22c, 22d and 22e, the individual detectors being positioned in end-to-end relationship to form an elongate stack of such detectors aligned generally parallel to source tube 20 and disposed with respect to source tube 20 and vessel 10 in the same manner as described with respect to the apparatus in FIG. 1. Each of the detector tubes 22a–22e is connected to an electronics console 26a by means of individual high voltage leads 24a, 24b, 24c, 24d and 24e, respectively. As in the case with the electronic console 26 shown in FIG. 1, console 26a supplies high voltage to the respective detector tubes 22a–22e and processes the signals from the detector tubes into a voltage or current proportional to the count rate produced in each of the detector tubes in response to slow neutrons detected in each of the detector tubes. It will be appreciated that when all of the detector tubes 22a–22e are operational, and the outputs are being summed by the electronic console 26a, the stacked array of detector tubes functions essentially as a single detector, such as detector tube 22 shown in FIG. 1. However, by providing a means to selectively, independently switch the detector tubes 22a–22e off and on, much greater precision and accuracy can be achieved. For example, assuming that all of the detector tubes 22a–22e are switched off except detector tube 22b which is in overlapping relationship to the interface 18, a much greater increase in precision and accuracy can be obtained as to the precise position of interface 18.

Assume, for example, that the detector tube 22 has a $\pm 1\%$ accuracy over the control span C. In other words, for a 12" span, the accuracy would be $\pm 0.12''$. Since the process which produces the slow neutrons is linear, the accuracy will be the same for a 60" long source-detector assembly. Accordingly, the $\pm 1\%$ accuracy will translate to $\pm 0.6''$ for the 60" span. Consider now the apparatus shown in FIG. 2 where it is assumed that each of the five detectors 22a–22e is 12" long or 20% of detector tube 22 shown in FIG. 1, which is assumed to be 60" long. (It will be appreciated that as many or as few detector tubes as desired can be employed.) If all of the detectors 22a–22e are on and summed, the accuracy would be essentially identical to that obtained from detector tube 22, i.e. $\pm 0.6''$. However, if detector tubes 22a, c, d and e are switched off and only detector tube 22b is switched on, one now reverts back statistically to a single 12" detector tube with an accuracy with $\pm 1\%$, i.e. $\pm 0.12''$. This provides an improvement of five in the accuracy of interface or level detection and is highly desirable when the interface 18 has been bracketed in a gross sense, but it is desired to know the position of interface 18 with a higher degree of accuracy. It will also be appreciated that should interface 18 rise or fall from the position shown in FIG. 2, so that it is out of the linear range of detector tube 22b, detector 22b can be switched off and the appropriate detector tube, i.e. 22a or 22c, etc., switched in to re-establish precise level detection.

It will thus be seen that using the stacked array of linear detector tubes 22a–22e, each of which has a linear response along its length, and if all tubes are switched on at any one time, the gross postiion of interface 28 can be determined after which a more precise location of interface 18 can be determined by switching off all detection tubes, except the detector tube which appropriately overlaps the interface 18.

Electronic console 26a, like console 26, and switches for selectively, independently turning the detector tubes 22a–22e off and on are commercially available and well known to those skilled in the art.

Figure 4:
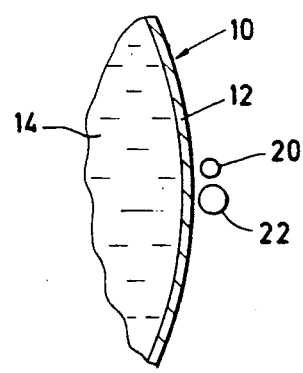
FIG. 4 is a view similar to FIG. 3 showing another relative positional relationship of the detector tube, the source tube and a vessel.
Figure 5:
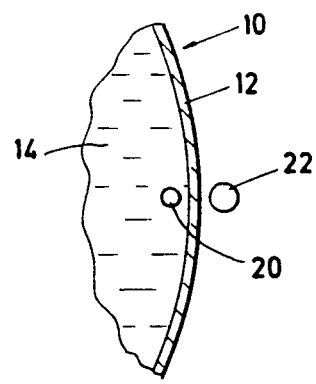
FIG. 5 is a view similar to FIG. 3 showing yet another relative positional relationship of the detector tube, the source tube and a vessel.
Figure 6:
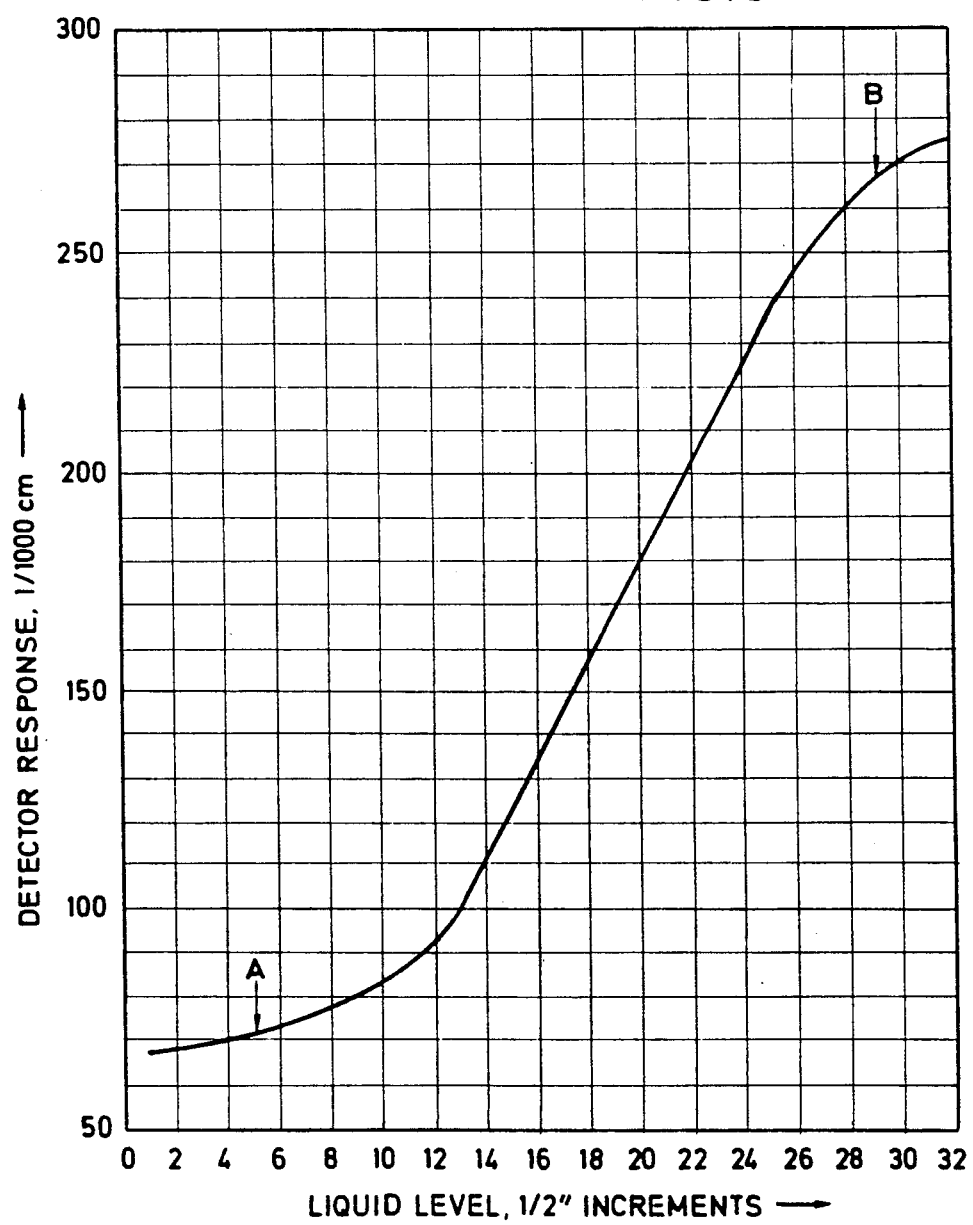
FIG. 6 is a plot of the digital count rate data against liquid level in a vessel measured at $\frac{1}{2}''$ increments.

It is preferred that the source tube, i.e. source tube 20, be longer than the detector tube 22 or, in the case of a stacked array of detector tubes, such as 22a–22e, longer than the stacked array. This aids in ensuring linearity throughout the length of the detector tube. Also, the source tube should have a L/D (length over diameter) of at least about 4, the source tube being preferably about as long as the detector tube and, as noted above, preferably longer. The source tube and the detector tube can be positioned with respect to one another in a variety of ways relative to the vessel 10 or any other suitable vessel. In this regard, reference is now made to FIGS. 3–5 which show the source tube 20 and the detector tube 22 in a laterally outward staggered array relative to the tank 10, i.e. substantially as shown in FIGS. 1 and 2, the source tube 20 being between vessel 10 and detector tube 22. Alternatively, as seen in FIG. 4, the source tube 20 and detector tube 22 can be in a side-by-side relationship with respect to the tank 10. In still another embodiment, the source tube can be disposed internally of the tank 10 (see FIG. 5), the detector tube being disposed outside tank 10. Whatever the relative disposition of the source tube and the detector tube, they should be in substantially parallel relationship to one another, and in the preferred case will be generally vertically disposed. The detector tube and source tube should also be in sufficient proximity to one another and to the vessel along with being in sufficient overlapping relationship to the interface to ensure linear response to the detector tube with a change in the position of the interface in the vessel within the control range. Obviously, the relative distance between the detector tube, the source tube and the vessel may have to be adjusted depending upon the type and shielding of its vessel, the strength of the source, the sensitivity of the detector, etc.

The source tubes, such as tube 20, are readily commercially available or can be conveniently fabricated by packing an intimate mixture of Americium-241 and beryllium oxides into a stainless steel tube having the desired L/D and being sealed at one end as, for example, by welding. In this regard, it should be noted that while the L/D ratio is important, the diameter of the source tube is not critical. In order to obtain a uniform flux density of fast neutrons emanating radially outwardly along the entire length of the source tube, it is desirable that the fast neutron source, whether it be a mixture of Americium-241 and beryllium oxides or some other fast neutron source be uniformly distributed along the length of the source tube. Also, the fast neutron source, e.g. the metal oxides, should be compacted carefully to ensure linearity. Once the tube has been filled and uniform compaction of the linear neutron source accomplished, the other end of the tube can then be sealed and, if necessary, the tube containing the fast neutron source telescoped inside a second stainless steel tube which is also closed at each end by welding, thereby ensuring double encapsulation of the fast neutron source to minimize any chance of loss or contamination by the neutron source material. It will also be understood that a suitable linear neutron source can be achieved by a stack of short sources thereby simulating a long linear source. Likewise, a stack of point sources would work to provide a long linear source.

Compounds or materials which provide a linear fast neutron source having a nominal emission of $1 \times 10^6$ neutrons per second can be conveniently employed. However, it should be understood that sources with both larger and smaller emissions can be employed to work as well, depending upon the circumstances. A mixture of Americium-241 and beryllium oxides is especially desirable due to its reliability and the fact that it is relatively inexpensive.

The detector tubes for detecting the slow neutrons are also commercially available, such detector tubes coming in lengths ranging from a few inches up to six feet. Although other detecting substances may be employed, He-3 filled detector tubes are preferred due to their high detection efficiency, stability and long life. Typically, a suitable detector can be obtained using a filling pressure of He-3 of two atmospheres, but higher or lower pressures may be used. Other gases which may be employed as slow neutron detectors include boron trifluoride and it will be appreciated that mixtures of slow neutron detecting substances can be employed as well.

An inherent advantage of the apparatus of the present invention is that a single strength fast neutron source will accommodate the detection of interfaces regardless of the vessel dimensions involved. Thus, a small tank and a large tank employ only the same relatively small linear fast neutron source for level control.

As noted, the apparatus of the present invention is to be distinguished from so-called point sources of fast neutrons used in combination with slow neutron detector tubes which basically are only useful to determine when a certain predetermined level has been reached as opposed to giving a reading indicating the change in level or interface. With such point source systems, the operator has to move the apparatus up and down the wall of the vessel until a change in signal output is indicated which tells the operator the position of the interface or liquid level in the vessel.

To more fully illustrate the present invention, the following non-limiting examples are presented.

EXAMPLE

A test apparatus consisting of an empty, thin-walled drum, a 12" long stainless steel tube packed with a homogeneous mixture of Americium-241 and beryllium oxides and a 12" detector tube containing helium-3 at two atmospheres was set up substantially as shown in FIG. 1. The electronic console consisted of a Ludlum instrument, Model 2200, single channel pulse height analyzer having both digital and analog output signals. Water was added in half inch increments and the detector count rate was measured digitally after each increment. FIG. 3 is a plot of the digital count rate data against liquid level (measured in half inch increments). As can be seen, after a small nonlinear region at the bottom of the source/detector tube array, which was due to an internal connector in the detector tube which reduced the effective detecting range of the detector tube at that end, a nearly linear response to change in liquid level was shown by the system. It can also be seen that a small region of less than perfect linearity is shown at the top end of the source/detector array. However, FIG. 3 shows a highly linear response between detector output and liquid level in the drum from nearly the bottom of the source/detector array indicated as point A on the curve in FIG. 3 to the top of the source/detector array indicated as point B on the curve in FIG. 3. For example, the response is quite linear from approximately 5" from the bottom of the source/detector array to approximately 1" from the top of the source/detector array. Thus, the liquid level or interface in the drum could be determined quite accurately over virtually the entire fill space of the drum and it will be appreciated that if the length of the source/detector assemblage was increased, the linearity would extend throughout the total heighth of the drum. This would make the control range on the drum extend from the bottom to the top of the drum.

It will be appreciated that the apparatus can be permanently installed or can be made portable by suitably installing the detector and source tube in a suitable movable mount.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. An apparatus for detecting the interface between a hydrogen-containing substance and a second substance of a different hydrogen content in a vessel comprising:
   a first elongate source body containing a source of fast neutrons, said first elongate body having a length to diameter ratio of at least about 4 and providing a substantially uniform flux density of fast neutrons radiating outwardly along the length of said first elongate body;
   a second elongate detector body, said detector body comprising a stacked array of individual detector modules, each of said detector modules being selectively, independently operative to detect slow neutrons, each of said detector modules having an output linearly responsive to the number of slow neutrons detected by said respective detector module;
   means for summing said outputs to produce a total detector output which correlates with the approximate location of said interface and alternatively switching between said total output and said outputs of said individual detector modules, said means for summing being operative to select a first output of a first individual detector module adjacent said approximate location of said interface, said first output of said first individual detector correlating to said location of said interface more accurately than said total output;
   said source body and said detector body being disposed in substantially parallel relationship to one another, in sufficient proximity to one another and to said vessel and in overlapping relationship to said interface whereby the output from said detector body varies substantially linearly with the change in position of said interface in said vessel.

2. The apparatus of claim 1 wherein said source body and said detector body are disposed substantially vertically.

3. The apparatus of claim 1 wherein said source body is longer than said detector body.

4. The apparatus of claim 1 wherein said source body is shorter than the detector body.

5. The apparatus of claim 1 wherein said source body is approximately the same length as the detector body.

6. The apparatus of claim 1 wherein said interface is to be detected in a pre-determined control range having a length C extending from a point c1 to c2 and said source body and said detector body having a length greater than C, said source body and said detector body extending beyond points c1 and c2 for a distance such that when said interface is between c1 and c2, said output from said detector varies substantially linearly with the position of said interface between said points c1 and c2.

7. The apparatus of claim 1 wherein said source comprises a cylindrical tube packed with an intimate mixture of Americium-241 and beryllium oxides.

8. The apparatus of claim 1 wherein said detector comprises a cylindrical tube filled with He-3.

9. The apparatus of claim 1 wherein said detector body comprises a stacked array of individual detector modules, each of said detector modules being selectively independently operative to detect said slow neutrons, each of said detector modules comprising a cylindrical tube filled with He-3, said first output of said first individual detector correlating to said location of said interface more accurately than said total output by a factor equal approximately to the number of individual detector modules in said stacked array.

* * * * *